United States Patent [19]

Vogt et al.

[11] Patent Number: 5,750,618
[45] Date of Patent: May 12, 1998

[54] PROCESS FOR THE PRODUCTION OF LATICES BASED ON CONJUGATED DIENES BY EMULSION POLYMERISATION

[75] Inventors: Hans-Günter Vogt, Dormagen; Heinrich Grave, Bergisch Gladbach; Hermann-Josef Bross, Leverkusen; Martin Matner, Odenthal, all of Germany

[73] Assignee: Bayer AG, Leverkusen, Germany

[21] Appl. No.: 804,639

[22] Filed: Feb. 25, 1997

[30] Foreign Application Priority Data

Feb. 29, 1996 [DE] Germany ............ 196 07 631.5

[51] Int. Cl.⁶ .................. C08L 9/10; C08L 9/04; C08L 11/02
[52] U.S. Cl. ............ 524/836; 524/821; 524/834
[58] Field of Search .................... 524/836, 821, 524/834

[56] References Cited

U.S. PATENT DOCUMENTS

| | | | |
|---|---|---|---|
| 4,082,714 | 4/1978 | Lo Scalzo et al. | 260/29.7 R |
| 4,130,523 | 12/1978 | Hoy et al. | 260/29.6 R |

OTHER PUBLICATIONS

Patent Abstracts of Japan, Appln. No. 06248030, Sep. 6, 1994, Takeda Chem Ind. Ltd.

Patent Abstracts of Japan, Appln. No. 02232204 Sep. 14, 1990, Asahi Chem Ind Co. Ltd.

Derwent Publications Ltd. JP 63 006 194, Asahi Chem Ind Co Ltd.

*Primary Examiner*—Thurman K. Page
*Assistant Examiner*—Wu C. Cheng
*Attorney, Agent, or Firm*—Connolly and Hutz

[57] ABSTRACT

Latices based on conjugated dienes are produced using emulsion polymerization by introducing the monomers to be polymerized into the initially introduced seed latex in the presence of a free-radical forming activator and an emulsifier in such a manner that the ratio of the monomer polymerization rate to the monomer feed rate is less than 0.7:1 and by performing polymerization up to a monomer conversion of $\geq 95\%$ at temperatures of 10 to 85° C., wherein the addition of the emulsifier is controlled in such a manner that the final particle size ($TG_L$) of the latex to be produced is governed by the following equation:

$$TG_L = TG_S \times (m_L/D_L)^{1/3} (m_S/D_S)^{1/3},$$

in which $D_L$ = density of the latex particles in the latex to be produced $D_S$ = density of the particles of the seed used $m_L$ = mass of the latex particles in the latex to be produced $m_S$ = mass of the particles of the seed used $TG_L$ = particle size of the latex to be produced $TG_S$ = particle size of the seed used.

7 Claims, No Drawings

PROCESS FOR THE PRODUCTION OF LATICES BASED ON CONJUGATED DIENES BY EMULSION POLYMERISATION

The present invention relates to a process for the production of latices based on conjugated dienes by emulsion polymerization. The latices produced using the process according to the invention are in particular suitable for the production of dipmoulded articles, such as gloves, synthetic leather, coatings, such as carpet backings, paper coatings and leather coatings.

Batch, semi-continuous and continuous processes for the production of latices by emulsion polymerization are known from the literature. Semi-continuous processes are understood to include both monomer feed and seed/monomer feed processes. In the latter process, the seed may either be formed in a first stage of the process (internal seed) or used in the polymerization as a separately produced seed (external seed).

Batch processes generally have the disadvantage that, for example, small deviations from the required values for the temperature or the starting materials can result in considerable variations in the particle count, which may in turn strongly influence the rate of polymerization.

In comparison with batch processes, feed processes have advantages with regard to reliability of production as only a proportion of the entire quantity of monomers is present during polymerization. However, in comparison with the batch process, the resultant homo- or copolymers of conjugated dienes are more highly crosslinked, which is disadvantageous for certain applications.

An object of the present invention is thus to provide a process which avoids the abovementioned disadvantages of the batch process and the abovementioned disadvantages of the feed process. The process according to the invention is intended to produce latices having, for example, a low degree of branching and/or of crosslinking combined with high elongation at break. The process according to the invention is also intended to be highly reproducible and to minimize the formation of secondary products (such as for example Dials-Alder products).

The present invention accordingly relates to a process for the production of latices based on butadiene and/or isoprene and/or chloroprene and optionally vinyl compounds which are copolymerizable therewith, by emulsion polymerization, which process is characterize in that the monomers to be polymerized are metered into the initially introduced seed latex having a particle size of 10 to 80 nm based on the monomers used in the process according to the invention or on inorganic pigments, in the presence of a free-radical forming activator and an emulsifier in such a manner that the ratio of the monomer polymerization rate to the monomer feed rate is 0.05 to 0.7:1, and wherein polymerization is performed up to a monomer conversion of $\geq 95\%$, at temperatures of 10 to 85° C., and the introduction of the emulsifier is controlled in such a manner that the final particle size ($TG_L$) of the latex to be produced is governed by the following equation (I):

$$TG_L = TG_S \times (m_L/D_L)^{1/3}/(m_S/D_S)^{1/3}$$

in which $D_L$ = density of the latex particles in the latex to be produced $D_S$ = density of the particles of the seed used $m_L$ = mass of the latex particles in the latex to be produced $m_S$ = mass of the particles of the seed used $TG_L$ = particle size of the latex to be produced $TG_S$ = particle size of the seed used, and wherein the quantity of emulsifier is 0.1 to 10% by weight, based on the total quantity of monomers used, the content of the abovementioned conjugated dienes in the copolymers is $\geq 15$ wt. %, the content of vinyl-group-containing comonomers constitutes $\leq 85$ wt. % and the quantity of initially introduced seed is 0.01 to 15 wt.% by weight, based on the total quantity of monomers used.

Further monomers which may be copolymerized with the abovementioned conjugated dienes are vinyl-group-containing compounds which may be used in the process according to the invention. Such vinyl-group-containing compounds are for example: acrylonitrile, methacrylonitrile, dichlorobutadiene, α-methylstyrene, styrene, acrylic acid esters, methacrylic acid esters, vinylcarboxylic acids, such as methacrylie acid, acrylic acid, fumaric acid and itaconic acid, as well as methacrylamide and/or acrylamide.

Further monomers which may be used are vinyl compounds containing N-methylolamide groups and/or ester or ether derivatives thereof. The following are mentioned: N-methylolacrylamide, N-methylolmethacrylamide, N-methoxymethyl (meth)acrylamide, N-n-butoxymethyl (meth)acrylarnide and/or N-acetoxymethyl (meth)acrylamide.

Vinyl compounds containing a sulphonic acid and/or a sulphonate group may also be used as vinyl compounds. The following may be mentioned: styrenesulphonic acid, vinylsulphonic acid, allylsulphonic acid, methallylsulphonic acid, (meth)acrylic acid 3-sulphopropyl ester, 2-acrylamido-2-methylpropanesulphonic acid, which may optionally be used in the form of their water-soluble salts, preferably (meth)acrylic acid 3-sulphopropyl ester and 2-acrylamido-2-methylpropanesulphonic acid.

Using the process according to the invention, it is possible to produce both homopolymers based on the abovementioned conjugated dienes and copolymers based on the abovementioned conjugated dienes with the abovementioned comonomers which are capable of copolymerisation. The proportion of conjugated dienes in the copolymers is usually $\geq 15$ wt. %, preferably 20 to 99 wt. %. The content of vinyl-group-containing comonomers is usually $\leq 85$ wt. %, preferably 80 to 1 wt. %.

In the copolymerisation, the quantitative ratio of the monomers used relative to each other is dependent upon the particular desired application of the latices to be produced. The optimum quantitative ratio of the monomers relative to each other may readily be determined by appropriate preliminary tests and may for example be deduced from the information provided on page 4, lines 13–26, of EP-A 0 422 370.

The process according to the invention is suitable in particular for the production of diene polymers and diene copolymers (1) which have for example the following composition of incorporated monomers (the indicated weight percentages add up to 100):

Ia) 85–100 wt. %, preferably 90–100 wt. %, butadiene, isoprene and/or chloroprene, Ib) 0–10 wt. %, preferably 0–5 wt. %, vinylcarboxylic acids, Ic) 0–10 wt. %, preferably 0–5 wt. %, acrylonitrile, methacrylonitrile, styrene, α-methylstyrene, methacrylic acid ester, acrylic acid ester and/or vinyl compounds containing sulphonate, sulphonic acid, amide and/or N-methylol-amide groups;

and for the production of (N)SBR latices (II) having the following composition:

IIa) 15–99 wt. %, preferably 20–99 wt. %, butadiene and/or isoprene,

IIb) 1–80 wt. %, preferably 1–60 wt. %, acrylonitrile, methacrylonitrile, styrene, (α-methylstyrene and/or methacrylic acid methyl ester, IIc) 0–25 wt. % (meth)acrylic acid $C_2$–$C_8$ ester, IId) 0–10 wt. % vinylcarboxylic acids, and IIe) 0–15 wt. % vinyl compounds containing sulphonate, sulphonic acid amide and/or N-methylolamide groups.

The seed suitable according to the invention consists of, for example, latices based on the latices to be produced according to the process according to the invention, as well as latices -based on monomers other than the latices to be produced. The following are, for example, suitable: latices based on styrene and/or acrylonitrile and/or methyl methacrylate and/or butadiene and/or one of the abovementioned vinyl-carboxylic acids. The following are preferably used as seed latices: homopolymer latices based on styrene or butadiene, carboxylated copolymer latices based on styrene or methyl methacrylate as the main monomers as well as the abovementioned vinylcarboxylic acids as comonomers.

The particle size of the initially introduced seed is in the range from 10 to 80 nm, preferably in the range from 20 to 50 nm.

Those inorganic pigments whose particles can act as seeds for the subsequent polymerization can also be used as seed for the process according to the invention. Pigments having an average particle size of 5 to 100 nm, such as silica sol, the use of which as seed for emulsion polymerization is described in the literature (Hergeth, Starre, Schmutzler, Wartewig, Polymer, 1988, Vol. 29, 1923–8; Furusawa, Kimura, Tagawa, J. CoUoid Interface Sci., 1986, 109(1), 69–76) are for example suitable.

In the process according to the invention, the entire quantity of the seed-to be used may be initially introduced or also only an appropriate proportion of all the seed to be used. The remainder of the seed may then be subsequently metered in over the course of the polymerization. In the process according to the invention, the entire quantity of the seed is preferably initially introduced into the monomers to be polymerized.

The quantity of the seed to be used is dependent upon the size of the latex to be produced and may be determined using the abovementioned equation (I). It is usually 0.01 to 15, preferably, 0.1 to 5 wt. %, based on the total quantity of monomers, for a particle size of 10 to 80 unm.

It is essential for the process according to the invention that the ratio of the monomer polymerization rate to the monomer feed rate is less than 0.7:1, preferably from 0.05 to 0.7:1, in particular from 0.05 to 0.6:1.

In the process according to the invention, the monomers used are polymerized in the presence of a free-radical forming activator, an emulsifier and in the presence of water. Free-radical forming activators which may be used in the process according to the invention are, for example, inorganic peroxy compounds, such as hydrogen peroxide, sodium, potassium and ammonium peroxydisulfate, peroxycarbonates and peroxyborates, as well as organic peroxy compounds, such as acyl hydroperoxides, diacyl peroxides, alkyl hydroperoxides and dialkyl peroxides, as well as esters, such as tert.-butyl perbenzoate, and combinations of inorganic and organic activators. The quantities of activators are usually within the range from 0.01 to 5 wt. %, based on the total quantity of monomers used, preferably in the range from 0.05 to 2.0 wt. %.

The abovementioned inorganic and organic peroxy compounds (activators) may also be used in a known manner in combination with one or more suitable reducing agents. Examples of such reducing agents which may be mentioned are: sulphur dioxide, alkali metal disulphites, alkali metal and ammonium hydrogen sulphites, thiosulphate, dithionite and formaldehyde sulphoxylates, as well as hydroxylamine hydrochloride, hydrazine sulphate, iron(II) sulphate, glucose and ascorbic acid. The quantity of reducing agent is 0.01 to 1.0 wt. %, based on the total quantity of monomers.

The most suitable activator may be determined by means of preliminary tests. Suitability is in particular dependent upon the nature of the monomers used and the polymerization reaction temperature.

It is frequently advisable to perform the emulsion polymerization additionally in the presence of buffer substances and chelating agents. Suitable substances are, for example: alkali metal phosphates and pyrophosphates (buffer substances) and the alkali metal salts of ethylenediaminetetraacetic acid (EDTA) as chelating agents.

The quantity of buffer substances and chelating agents is usually 0.01 to 1 wt. %, based on the total quantity of monomers.

Chain transfer agents (regulators) are frequently also used in emulsion polymerization. Typical agents are, for example, organic sulphur compounds, such as $C_1$–$C_{15}$ alyl mercaptans, n-, i- and t-dodecyl mercaptan being preferred. The quantity of chain transfer agent is usually 0.05 to 3 wt. %, preferably 0.2 to 2.0 wt. %, relative to the total weight of monomers used.

It is also of significance in the emulsion polymerization according to the invention that the addition of the necessary stabiliser and/or emulsifier is controlled in such a manner that the final particle size of the finished latex is governed by the above-mentioned equation. The emulsifiers are known and are commonly used in emulsion polymerization (D.C. Blackley, Emulsion Polymerization, chapter 7, Applied Science Publishers Ltd., London, 1975).

Emulsifiers which may be used according to the invention are in particular: so-called anionic emulsifiers, such as higher fatty alcohol sulphates, higher alkyl sulphonates, alkylaryl sulphonates, aryl sulphonates, together with the condensation products thereof with formaldehyde, salts of sulphosuccinic acid esters and sulphated ethylene oxide adducts.

So-called non-ionic emulsifiers [may] also [be mentioned], such as for example the known reaction products of ethylene oxide with fatty alcohols, such as lauryl, myristyl, cetyl, stearyl and oleyl alcohol, with fatty acids, such as lauric, myristic, palmitic, stearic and oleic acid, and the amides thereof, and with alkylphenols, such as isooctyl-, isononyl- and dodecylphenol.

The salts of fatty acids and resin acids are in particular suitable for polymerization in the alkaline pH range:

The stated emulsifiers are generally used in quantities of 0.1 to 10 wt. %, in particular of 0.2 to 8 wt. %, based on the total quantity of monomers used.

The total quantity of emulsifier to be used is calculated such that the latex is stabilized during polymerization in such a manner that no coagulate is formed. On the other hand, the emulsifier should not be added in too large a quantity nor at too early a stage, since new latex particles are otherwise formed, which results in an uncontrolled increase in polymerization rate. By verifying the final particle size calculated using equation (1) from the introduced quantity and particle size of the seed, it may readily be ascertained whether the emulsifier has been added in a manner such that neither new latex particles have been formed, nor the agglomeration of originally present particles has occurred.

The quantity of water to be used in the emulsion polymerization is usually calculated to give a solids concentration of the latex in water of 40 to 55 wt. %.

The process according to the invention is particularly suitable for the production of acrylonitrile/butadiene copolymer latices. The preferred monomers for the production of the acrylonitrile/butadiene copolymer latices are 15 to 60 wt. % of acrylonitrile and/or methacrylonitrile, 39 to 84 wt. % of butadiene, 0 to 10 wt. % of one of the abovementioned vinyl carboxylic acids as well as 0 to 25 wt. % of an acrylic acid and/or methacrylic acid ester and/or styrene and 0 to 15 wt. % of a vinyl compound containing a sulphonate, amide, N-methylolamide and/or etherified and/or esterified N-methylolamide group.

The acrylonitrile/butadiene copolymer latices are produced in the presence of a redox activator based on peroxy compounds with suitable reducing agents. Particularly suitable redox activators for this purpose are those based on hydroperoxides, such as cumene hydroperoxide, diisopropylbenzene hydroperoxide or t-butyl hydroperoxide combined with alkali/formaldehyde sulphoxylate or alkali disulphite as reducing agent. Polymerization is preferably performed in the presence of small quantities (0.0001 to 0.1 wt. %, based on the total quantity of monomers used) of Fe(II) salts, optionally with the addition (up to 0.5 wt. %) of a complexing agent, such as for example EDTA.

It has proved advantageous when producing the acrylonitrile/butadiene copolymer latices initially to perform the polymerization to a monomer conversion of up to 60%, preferably of up to 70%, at temperatures of 10° to 60° C. and then to complete the reaction to a conversion of $\geq 95\%$, preferably of $\geq 98\%$, at a temperature some 10° to 20° C. higher (relative to the temperature selected in the first stage) (up to a maximum of 80° C.). One or more emulsifiers are added to the polymerization reaction in such a manner that the growing latex particles are kept stable and the final particle size from equation (I) is achieved. Acrylonitrile/butadiene copolymer latices having particle sizes in the range from 80 to 200 nm are preferably produced using the process according to the invention. The total quantity of emulsifiers to be used is selected in such a manner that no coagulate is formed during the polymerization reaction. Depending upon the desired particle size, experience has shown that 1 to 8 wt. % of emulsifiers, based on the total quantity of monomers used, are required for this purpose.

The process according to the invention has the following advantage: it provides virtually coagulate-free polymerization with excellent reproducibility of particle size and polymerization rate, even for critical monomer compositions, the polymerization of which is difficult to control and reproduce using the conventional prior art. Such cases include, for example, the polymerization of acrylonitrile/ butadiene copolymer latices having an acrylonitrile content of >40 wt. %.

With regard to the applicational properties of the latices, the following advantages over conventional processes should be emphasized: high elongation at break values, high tensile strengths together with good abrasion characteristics of the dried polymer films produced therefrom, both in the uncrosslinked stated and, if so desired for the application, in the vulcanized state. Moreover, in comparison with latices produced with conjugated dienes using the batch process, latices produced according to the invention are distinguished by a lower content of unwanted Diels-Alder secondary products.

The latices based on conjugated dienes and produced using the process according to the invention are in particular used in the production of dip-moulded articles and synthetic leather base materials, for binding fibers of any kind and for coating paper, leather, textiles, non-wovens or carpet backings.

The particle sizes stated in the Examples were determined by laser correlation spectroscopy. The particle size distribution was additionally determined for the seed latex using an ultracentrifuge and the number average particle size ($TG_S$) was found to be 37 nm. The density of the particles of the seed used in the seed latex was 1.06 g/cm in all the examples.

In the stated Examples, samples were taken during polymerization and the polymerization conversion calculated from the solids content determined by evaporation. The ratio of polymerization rate to feed rate ($V_{(polym.)}$: $V_{(feed)}$) was calculated from the conversion determined at the moment of completion of monomer addition.

EXAMPLES

Example 1

40 g of a 30% seed latex (particle size 37 mn) are heated to 80° C. in a nitrogen-purged autoclave with 302 g of water and to this is added within 2 hours a monomer/chain transfer agent mixture consisting of 368 g of styrene, 600 g of butadiene, 20 g of acrylic acid and 10 g of t-DDM (tertiary dodecyl mercaptan). In parallel, an emulsifier feed consisting of 8 g of Na dodecylbenzene sulphonate, 1 g of caustic soda, 1 g of ammonium persulphate and 450 g of water is added within 2 hours. After 2 hours, an activator feed period of 8 hours is begun, the activator consisting of 3 g of ammonium persulphate and 60 g of water. The temperature throughout the polymerization was 80° C. After a total polymerization time of 15 h, the concentration determined by evaporation was 54.4%, corresponding to a conversion of 98.9%.

The ratio between polymerization rate and feed rate of the monomers was 0.25:1. Particle size was determined to be 163 nm (calculated 167 nm).

Comparative Example 1

40 g of a 30% seed latex (particle size 37 nm) are heated to 80° C. in a nitrogen-purged autoclave with 302 g of water and to this is added within 12 hours a monomer/chain transfer agent mixture consisting of 368 g of styrene, 600 g of butadiene, 20 g of acrylic acid and 10 g of t-DDM. In parallel, an emulsifier feed consisting of 8 g of Na dodecylbenzene sulphonate, 1 g of caustic soda, 1 g of ammonium persulphate and 510 g of water is added within 12 hours. The temperature throughout the polymerization was 80° C. After a total polymerization time of 18 h, the concentration determined by evaporation was 54.6%, corresponding to a conversion of 99.2%.

The ratio between polymerization rate and feed rate of the monomers was 0.80:1. The particle size was determined to be 169 nm (calculated 167 mn).

Properties of the films produced from the latices:

|  | Example 1 | Comparative Example 1 |
|---|---|---|
| Tensile strength[1] [MPa] | 1.8 | Not determinable since |
| Elongation at break[1] [%] | 425 | film severely cracked. |

[1]according to DIN 53 504

Example 2

67 g of a 30% seed latex (particle size 37 nm) are heated to 40° C. in a nitrogen-purged autoclave with 853 g of water, 0.5 g of tetrasodium ethylenediaminetetra-acetate (Na$_4$EDTA), 0.05 g of Na formaldehyde sulphoxylate and 0.05 g of iron(II) sulphate, 1.0 g of t.-butyl hydroperoxide was added and a monomer/chain transfer agent mixture consisting of 450 g of acrylonitrile, 480 g of butadiene, 40 g of methacrylic acid and 5 g of t-DDM is introduced within 3 hours. In parallel, the emulsifier/activator mixture consisting of 30 g of sodium lauryl sulphate, 0.5 g of Na formaldehyde sulphoxylate and 280 g of water is introduced within 5 hours. After a total polymerization time of 15 h at 40° C., the concentration determined by evaporation was 46.3%, corresponding to a conversion of 99.4%.

The ratio between polymerization rate and feed rate of the monomers was 0.22:1. The particle size was determined to be 134 nm (calculated 138 nm).

Comparative Example 2a 67 g of a 30% seed latex (particle size 37um) are heated to 40° C. in a nitrogen-purged autoclave with 853 g of water, 0.5 g of Na$_4$EDTA, 0.05 g of Na formaldehyde sulphoxylate and 0.05 g of iron(II) sulphate, 1.0 g of t.-butyl hydroperoxide was added and a monomer/chain transfer agent mixture consisting of 450 g of acrylonitrile, 480 g of butadiene, 40 g of methacrylic acid and 5 g of t-DDM is added within 12 hours. In parallel, an emulsifier/activator mixture consisting of 30 g of sodium lauryl sulphate, 0.5 g of Na formaldehyde sulphoxylate and 280 g of water is added within 12 hours. After a total polymerization time of 15 h at 40° C., the concentration determined by evaporation was 46.1%, corresponding to a conversion of 98.9%.

The ratio between polymerization rate and feed rate of the monomers was 0.81:1. The particle size was determined to be 145 nm (calculated 138 um).

Comparative Examples 2b and 2c 950 g of water, 7.5 g of sodium lauryl sulphate, 0.5 g of Na$_4$EDTA are heated to 40° C. in a nitrogen-purged autoclave with a monomer/chain transfer agent mixture consisting of 450 g of acrylonitrile, 510 g of butadiene, 40 g of methacrylic acid and 5 g of t-DDM. The mixture is activated with a solution of 0.05 g of Na formaldehyde sulphoxylate, 0.05 g of iron(II) sulphate in 50 g of water with the addition of 1.0 g of t.-butyl hydroperoxide and polymerized at 40° C. At solids contents of 15% and 30%, determined from an evaporated sample, a solution of 11.25 g of sodium lauryl sulphate, 0.125 g of sodium formaldehyde sulphoxylate in 90 g of water is added on each occasion.

Polymerization of Comparative Example 2b was preceded by a 3 hour inhibition period and, after 23 hours, conversion was 99% and the particle size 129 nm. In Comparative Example 2c, polymerization began immediately and 99.5% conversion was achieved after only 12 hours while the particle size was only 100 nm.

Comparison of the polymer properties of Example 2 with Comparative Examples 2a, 2b and 2c:

| | Example | Comparative Examples | | |
|---|---|---|---|---|
| | 2 | 2a | 2b | 2c |
| $V_{(polym.)}$ : $V_{(feed)}$ | 0.20:1 | 0.81:1 | Batch | Batch |
| Particle size [nm] | 134 | 145 | 129 | 100 |
| 4-cyanocyclohexene [ppm] | 800 | 650 | 2750 | |
| Defo hardness [N] | 96 | 90 | 84 | 71 |

-continued

Comparison of the polymer properties of Example 2 with Comparative Examples 2a, 2b and 2c:

| | Example | Comparative Examples | | |
|---|---|---|---|---|
| | 2 | 2a | 2b | 2c |
| Properties of the vulcanised films[1]: | | | | |
| Tensile strength[2] [MPa] | 20.8 | 11.4 | 20.1 | 19.0 |
| Elongation at break[2] [%] | 301 | 191 | 324 | 339 |
| Tear propagation strength[3] [N/min] | 52 | 41 | 47 | 43 |

[1]16.0 wt. % of vulcanisation paste (1.5 wt. % zinc oxide; 1.5 wt. % sulphur; 0.6 wt. % zinc N-diethyldithiocarbamate; 0.4 wt. % zinc mercaptobenzothiazole; 0.4 wt. % zinc N-pentamethylenedithiocarbamate; 2.0 wt. % of titanium dioxide; 0.48 wt. % Na salt of a naphthalenesulphonic acid condensation product; 9.12 wt. % water) per 100 wt. % of latex dry matter. Vulcanisation, 30 minutes in hot air at 105° C..
[2]according to DIN 53 504
[3]according to ASTM D 624

Example 2 describes the production according to the invention of an acrylonitrile/butadiene copolymer latex containing 45 wt. % of acrylonitrile and compares this with a prior art feed process (Comparative Example 2a) and a conventional batch process (Comparative Examples 2b, c). The Defo hardness of these latices was determined as a measured of the plastic deformability of the latices. Despite virtually identical Defo values, the tensile strength, elongation at break and tear propagation strength of the vulcanized films of the polymer from Example 2 are superior to those of Comparative Example 2a. In relation to Comparative Example 2b, the same level of performance is achieved, but the disadvantages of poor reproducibility with regard to the course of polymerization and to particle size of the final latex in Comparative Examples 2b, c are avoided.

Example 3

In Example 3 and Comparative Examples 3a and 3b, the quantity of chain transfer agent used for polymerization was raised to 1.0 wt. %, based on the monomers used, compared to the 0.5 wt. % used in Examples 2, 2a and 2b.

67 g of a 30% seed latex (particle size 37 nm) are heated to 40° C. in a nitrogen-purged autoclave with 853 g of water, 0.5 g of Na$_4$EDTA, 0.05 g of Na formaldehyde sulphoxylate and 0.05 g of iron(II) sulphate, 1.0 g of t.-butyl hydroperoxide was added and a monomer/chain transfer agent mixture consisting of 450 g of acrylonitrile, 480 g of butadiene, 40 g of methacrylic acid and 10 g of t-DDM is introduced within 3 hours. In parallel, an emulsifier/activator mixture consisting of 30 g of sodium lauryl sulphate, 0.5 g of Na formaldehyde sulphoxylate and 280 g of water is added within 5 hours. After a total polymerization time of 15 h at 40° C., the concentration determined by evaporation was 46.4%, corresponding to a conversion of 99.4%.

The ratio between polymerization rate and feed rate of the monomers was 0.20:1. The particle size was determined to be 136 nm (calculated 138 nm).

Comparative Example 3a 67 g of a 30% seed latex (particle size 37 un) are heated to 40° C. in a nitrogen-purged autoclave with 853 g of water, 0.5 g of Na$_4$EDTA, 0.05 g of Na formaldehyde sulphoxylate and 0.05 g of iron(II) sulphate, 1.0 g of t.-butyl hydroperoxide was added and a monomer/chain transfer agent mixture consisting of 450 g of acrylonitrile, 480 g of butadiene, 40 g of methacrylic acid and 10 g of t-DDM is introduced within 12 hours. In parallel, an emulsifier/activator mixture consisting of 30 g of sodium lauryl sulphate, 0.5 g of Na formaldehyde sulphoxylate and 280 g of water is introduced within 12 hours. After a total polymerization time of 15 h at 40° C., the concentration determined by evaporation was 46.0%, corresponding to a conversion of 98.2%.

The ratio between polymerization rate and feed rate of the monomers was 0.81:1. The particle size was determined to be 138 nm (calculated 138 nm).

Comparative Example 3b 950 g of water, 7.5 g of sodium lauryl sulphate, 0.5 g of Na$_4$EDTA are heated to 40° C. in a nitrogen-purged autoclave with a monomer/chain transfer agent mixture consisting of 450 g of acrylonitrile, 510 g of butadiene, 40 g of methacrylic acid and 10 g of t-DDM. The mixture is activated with a solution of 0.05 g of Na formaldehyde sulphoxylate, 0.05 g of iron(II) sulphate in 50 g of water with the addition of 1.0 g of t.-butyl hydroperoxide and polymerized at 40° C. At solids contents of 15% and 30%, determined from an evaporated sample, a solution of 11.25 g of sodium lauryl sulphate, 0.125 g of sodium formaldehyde sulphoxylate in 90 g of water is added on each occasion.

Polymerization was uncontrollable within the conversion range between 50 and 70%, an uncontrolled rise in temperature from 40° to 55° being observed. Polymerization was complete after only 7 hours. The concentration of the latex was 46.7%, corresponding to a conversion of 99.5%. The particle size was only 86 nm.

Comparison of the polymer properties of Example 3 with Comparative Examples 3a, 3b and 3c:

|  | Example | Comparative Examples | |
|---|---|---|---|
|  | 3 | 3a | 3b |
| $V_{(polym.)}:V_{(feed)}$ | 0.20:1 | 0.81:1 | Batch |
| Particle size [nm] | 138 | 138 | 86 |
| Defo hardness [N] | 41 | 64 | 55 |
| Properties of the uncrosslinked films: | | | |
| Tensile strength[1] [MPa] | 8.1 | 7.6 | 6.5 |
| Elongation at break[1] [%] | 950 | 609 | 587 |
| Properties of the vulcanised films[3]: | | | |
| Tensile strength[1] [MPa] | 21.8 | 17.2 | 18.5 |
| Elongation at break[1] [%] | 454 | 330 | 300 |
| Tear propagation strength[2] [N/mm] | 38 | 45 | 41 |

[1] according to DIN 53 504
[2] according to ASTM D 624
[3] 16.0 wt. % of vulcanisation paste (1.5 wt. % zinc oxide, 1.5 wt. % sulphur; 0.6 wt. % zinc N-diethyldithiocarbamate; 0.4 wt. % zinc mercaptobenzothiazole; 0.4 wt. % zinc N-pentamethylenedithiocarbamate; 2.0 wt. % of titanium dioxide; 0.48 wt. % Na salt of a naphthalenesulphonic acid condensation product; 9.12 wt. % water) per 100 wt. % of latex dry matter. Vulcanisation, 30 minutes in hot air at 105° C.

Comparative Example 3b performed using a batch process demonstrates that polymerization is uncontrollable in this process. It may be seen from a comparison of Example 3 with Comparative Examples 3a and 3b that monomer addition according to the invention brings about advantages with regard to polymer film properties, both in the uncrosslinked and in the vulcanized state.

We claim:

1. A process for the production of latices based on conjugated dienes selected from butadiene, isoprene, chloroprene and mixtures thereof, and optionally vinyl compounds which are copolymerizable with the conjugated dienes, by emulsion polymerization, wherein the monomers to be polymerized are metered into an initially-introduced seed latex having a particle size of 10 to 80 nm, which seed latex is based on the monomers used in the process or is based on inorganic pigments, in the presence of a free-radical forming activator and an emulsifier, such that the ratio of the monomer polymerization rate to the monomer feed rate is 0.05 to 0.7:1, and wherein polymerization is performed up to a monomer conversion of ≧95% at temperatures of 10° to 85° C., the introduction of the emulsifier is controlled in such a manner that the final particle size (TG$_L$) of the latex to be produced is governed by the following equation:

$$TG_L = TG_S \times (m_L/D_L)^{1/3}/(m_S/D_S)^{1/3}$$

in which

D$_L$=density of latex particles in the latex to be produced
D$_S$=density of the particles of the seed used
m$_L$=mass of the latex particles in the latex to be produced
m$_S$=mass of the particles of the seed used
TG$_L$=particle size of the latex to be produced
TG$_S$=particle size of the seed used, and wherein the quantity of emulsifier is 0.1 to 10 wt. %, based on the total weight of monomers used, the content of the above-mentioned conjugated dienes in the copolymers is ≧15 wt. %, the content of the vinyl-group-containing comonomers constitutes ≦85 wt. % and the quantity of initially introduced seed is 0.01 to 15 wt. %, based on the total quantity of the monomers used.

2. The process according to claim 1, wherein the polymerization is performed at temperatures of 20° to 80° C.

3. The process according to claim 1 wherein the polymerization is performed to a conversion of >98%.

4. The process of claim 1, wherein the latices comprise: 85–100 wt. % butadiene, isoprene and/or chloroprene, 0–10 wt. % vinylcarboxylic acids, and 0–10 wt. % acrylonitrile, methacrylonitrile, styrene, α-methylstyrene, methacrylic acid ester, acrylic acid ester and/or vinyl compounds containing sulphonate, sulphonic acid, amide and/or N-methylolamide groups.

5. The process of claim 1, wherein the latices comprise:

15–90 wt. % butadiene and/or isoprene,

1–80 wt. % acrylonitrile methacrylonitrile, styrene, α-methylstyrene and/or methacrylic acid methyl ester, 0–25 wt. % (meth)acrylic acid C$_2$-C$_8$ ester, 0–10 wt. % vinylcarboxylic acids, and 0–15 wt. % vinyl compounds containing sulphonate, sulphonic acid amide and/or N-methylolamide groups.

6. The process of claim 1, wherein the seed comprises a latice based on styrene, acrylonitrile, methyl methacrylate, butadiene, vinylcarboxylic acids, or mixtures thereof.

7. The process of claim 1, wherein the seed has a particle size of 20–50 nm.

* * * * *